United States Patent
Carlson et al.

(10) Patent No.: US 6,375,163 B1
(45) Date of Patent: Apr. 23, 2002

(54) CABLE STRINGING BLOCK

(75) Inventors: Derek Carlson, Hooper; Kenn Dayton, Salt Lake City; Russ Vance, West Jordan; George Vent, Sandy, all of UT (US)

(73) Assignee: Wireline Technologies, Inc., North Salt Lake, UT (US)

( * ) Notice: Subject to any disclaimer, the term of this patent is extended or adjusted under 35 U.S.C. 154(b) by 0 days.

(21) Appl. No.: 09/513,160

(22) Filed: Feb. 25, 2000

Related U.S. Application Data
(60) Provisional application No. 60/122,154, filed on Feb. 26, 1999.

(51) Int. Cl.$^7$ .................................................. H02G 1/08
(52) U.S. Cl. ........................ 254/134.3 R; 254/134.3 PA
(58) Field of Search ............................... 254/134.3 PA, 254/134.3 R

(56) References Cited

U.S. PATENT DOCUMENTS

| | | | |
|---|---|---|---|
| 2,654,571 A | | 10/1953 | Albright, Jr. |
| 3,837,623 A | * | 9/1974 | Chadwick, Jr. ..... 254/134.3 PA |
| 3,905,581 A | | 9/1975 | Chadwick, Jr. ............. 254/193 |
| 4,018,422 A | * | 4/1977 | Bozeman, Jr. ...... 254/134.3 PA |
| 4,057,211 A | | 11/1977 | Moore |
| 4,151,903 A | | 5/1979 | Martino |
| 4,301,994 A | * | 11/1981 | Lindsey ............... 254/134.3 PA |
| 4,309,128 A | | 1/1982 | Williams |
| 4,632,364 A | * | 12/1986 | Smith .................. 254/134.3 PA |
| 4,685,831 A | | 8/1987 | Mahoney |
| 5,236,177 A | | 8/1993 | Tamm |
| 5,328,297 A | | 7/1994 | Handford |
| 5,533,710 A | * | 7/1996 | Sauber ................ 254/134.3 PA |
| 5,645,269 A | | 7/1997 | Peterson ...................... 254/398 |
| 5,735,505 A | * | 4/1998 | Walton ............... 254/134.3 PA |
| 5,941,507 A | * | 8/1999 | Page ................... 254/134.3 PA |
| 6,138,992 A | | 10/2000 | Bell |

OTHER PUBLICATIONS

Evans, Charles M., "Distribution Conductor Stringing Equipment and Techniques for the Nineties", Sherman & Reilly, Inc. pp. 1–6.
On–line publication of Model X–100–B Universal Stringing Block by Sherman & Reilly, Inc.
On–line publication of Stringing block by MPS Products.
On–line publication of Single Conductor Stringing Blocks by Sherman & Reilly, Inc.

* cited by examiner

*Primary Examiner*—Joseph J. Hail, III
*Assistant Examiner*—Lee Wilson
(74) *Attorney, Agent, or Firm*—Madson & Metcalf

(57) ABSTRACT

A cable stringing block assembly is disclosed having a frame and axle assembly configured to hold a non-conducting sheave wheel. The sheave wheel is fabricated of a durable polymeric material. In one embodiment, the sheave wheel is self-lubricating, having a coefficient of friction less than 0.5. A handle is optionally affixed to the frame structure to facilitate transport of the block assembly. In another embodiment, a spring-biased fly gate facilitates side-loading of the cable. A helicopter arm can also be provided for helicopter loading of the cable. The cast aluminum frame can be anodized to disguise its appearance from scrap aluminum thieves and provide additional weather protection.

20 Claims, 4 Drawing Sheets

CABLE STRINGING BLOCK

This application claims the benefits of Ser. No. 60/122,154 filed Feb. 26, 1999.

FIELD OF THE INVENTION

The present invention relates to installing cable suspensions and particularly cable stringing blocks used to install cables such as power transmission and distribution conductor cables, as well as communications cables.

BACKGROUND OF THE INVENTION

There is a continuing need by power utility companies to string power conductor cables within their transmission and distribution networks. There are generally two types of power networks: transmission networks which carry very high voltage power cables over long distances from power plants to substations and distribution networks which carry lower voltage power cables to the power consumer.

Installation of transmission and distribution power conductor cables typically requires the use of a stringing block having a sheave wheel. Transmission stringing blocks generally use wheels having a diameter ranging from about 10 inches to about 50 inches, with 16 to 22 inch wheels being most common. Distribution stringing blocks generally use wheels having a diameter ranging from about 3 inches to about 10 inches, with a seven inch wheel being most common.

Current commercially available cable stringing blocks use aluminum wheels in an aluminum frame. These aluminum wheels tend to wear out quickly and damage the conductor cable being installed. Sherman & Reilly, Inc., Chattanooga, Tenn., and Bethea Power Products (a division of MacLean Power Systems), Pelham, Ala., are two known manufacturers of cable stringing blocks.

Recognizing the wear problems associated with conventional aluminum wheels, some manufacturers of cable stringing blocks have begun lining the aluminum wheel with conductive neoprene or polyurethane. The neoprene and polyurethane provide some protection to the conductor cable, but they wear out quickly, providing only temporary protection. In addition, the polyurethane and neoprene are susceptible to weather and ultraviolet rot. Most recently, one manufacturer has proposed replacing the aluminum wheels with cast iron as a solution to the foregoing problems.

Both the wheel and frame have historically been constructed of a conducting material for safety reasons, explained below. When installing power transmission cable, particularly where a new line is installed parallel to a live line, there is a serious potential of generating a static charge within the new line. Powerful electric charges have been known to jump from the new line to the ground. Recognizing this risk, it has been common to ground the new line through the stringing blocks. Even though the stringing blocks are made of conducting materials, applicants have observed that conventional stringing blocks are not sufficiently conductive to provide an adequate ground. They have been known to burn up when powerful electric charges surge through the blocks.

Another, lesser known, problem with conventional cable stringing blocks arises from their aluminum parts, i.e., the aluminum frame and wheel. Aluminum scavengers have been known to steal the stringing blocks from construction sites and sell them for their scrap aluminum value.

It will be appreciated that there remains a need in the art for cable stringing blocks which utilize wheels that are durable, yet protect the cable being strung. It also would be an advancement in the art to avoid the danger and problems associated with conductive wheels and blocks. It would be a significant improvement in the art to provide a way of reducing the theft of aluminum distribution blocks.

SUMMARY OF THE INVENTION

The present invention is directed to a cable stringing block assembly used to install cables such as power and communication cables. The block includes a frame structure, an axle assembly, and a non-conducting sheave wheel.

The frame is preferably constructed of cast aluminum. The frame can be anodized to disguise its aluminum appearance from scrap aluminum thieves and provide additional weather protection.

The wheel may vary in size depending upon the cable and required load. For example, when installing power distribution cable, the wheel size typically ranges from three to ten inches. When installing power transmission cable, the wheel size typically ranges from ten to fifty inches.

Importantly, the wheel is fabricated of a durable polymeric material. In a preferred embodiment the polymeric material is self-lubricating, having a low coefficient of friction less than 0.5. A variety of engineering plastics can be used, particularly those containing nylon. One currently preferred polymeric material is PA6-G-type nylon.

In a preferred embodiment, a handle is affixed to the frame structure to facilitate transport and positioning of the block assembly. A spring-biased fly gate is preferably provided to facilitate side-loading of the power conductor cable. Unlike other known spring-biased fly gates, the fly gate according to the present invention does not lock to the frame to provide structural support. A helicopter loading arm can be used in connection with the fly gate to facilitate helicopter loading of the cable.

DETAILED DESCRIPTION OF THE INVENTION

Figure 1:
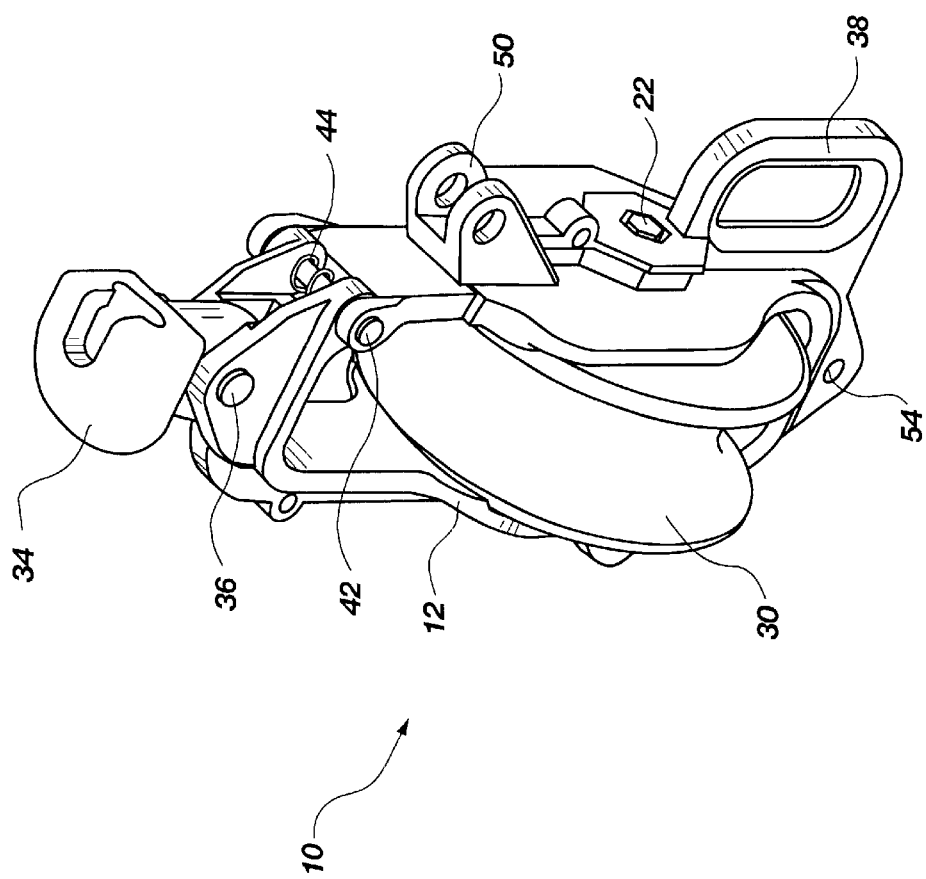
FIG. 1 is a perspective view of one cable stringing block within the scope of the present invention.
Figure 2:
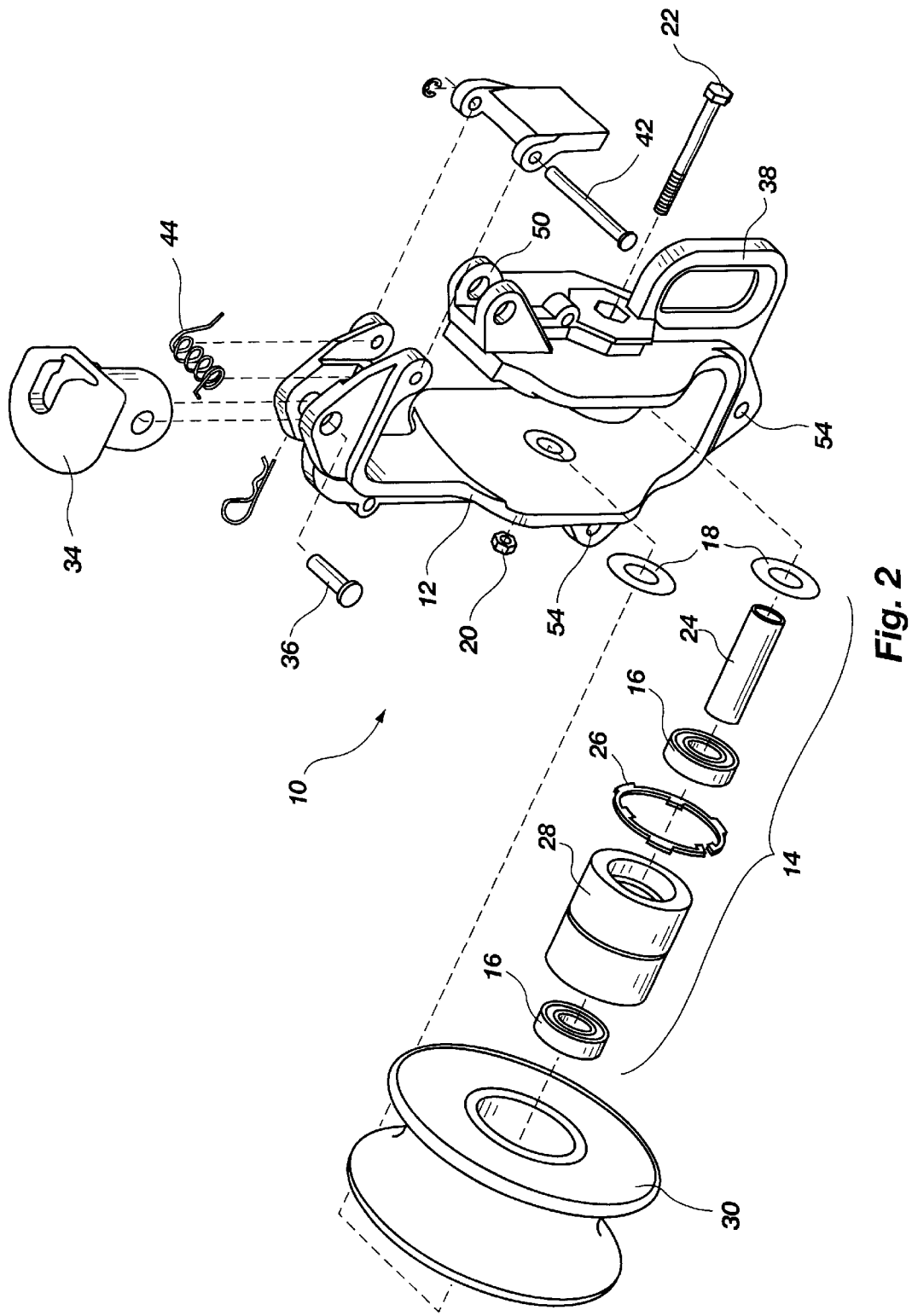
FIG. 2 is an exploded perspective view of the cable stringing block shown in FIG. 1.
Figure 3:
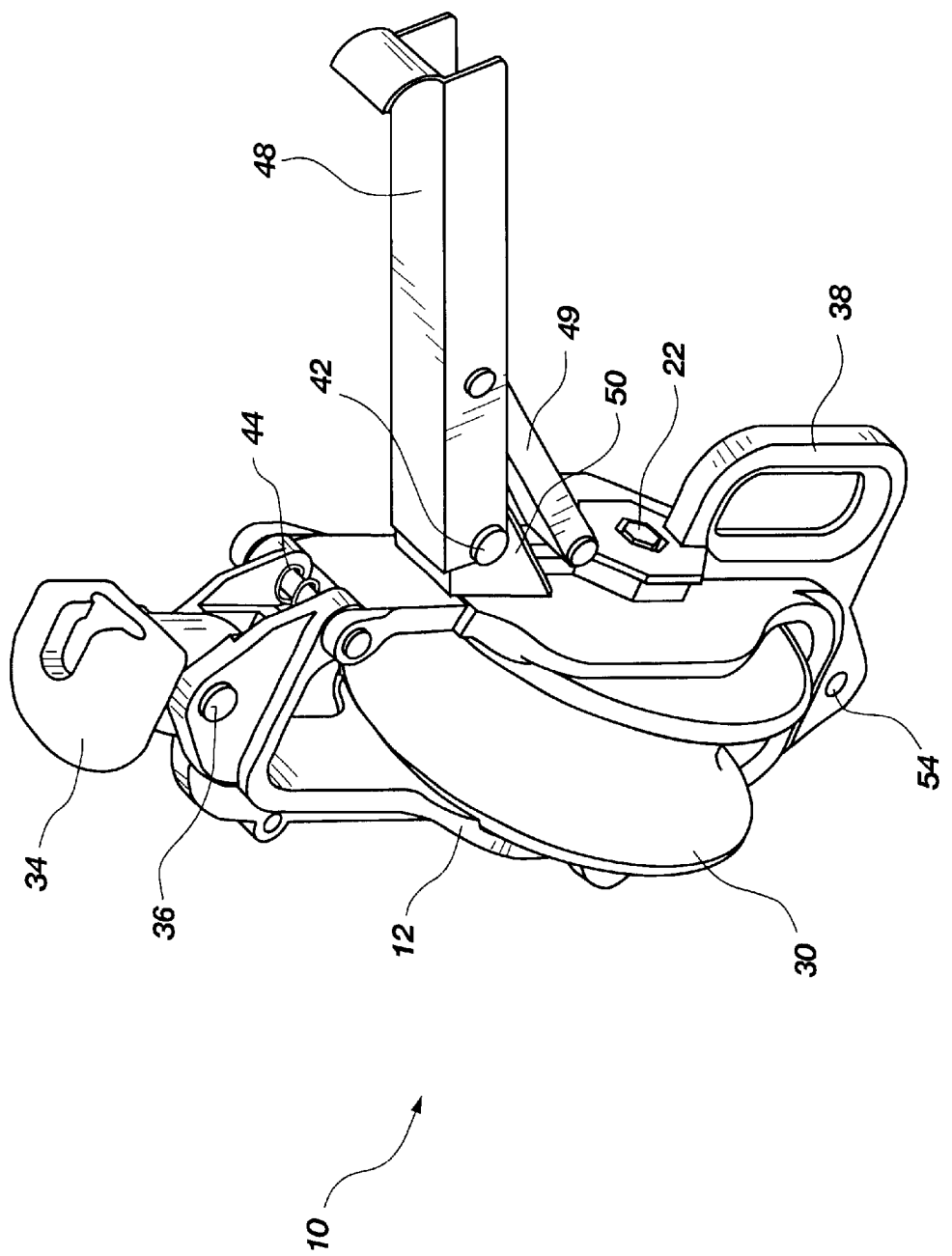
FIG. 3 is a perspective view of the cable stringing block of FIG. 1 with a helicopter loading arm installed.

Reference is now made to the figures. One configuration of the cable stringing block within the scope of the present invention is illustrated in FIGS. 1–3. The illustrated stringing block assembly 10 is particularly adapted for use in stringing power distribution cables. The stringing block 10 includes a frame structure 12. It is currently preferred to manufacture the frame 12 of durable cast aluminum, such as A356 grade aluminum alloy. Heat treating can provide additional strength to the aluminum frame. To help disguise the appearance of the cast aluminum frame 12 and to provide weather protection, the aluminum frame can be anodized. It is currently preferred to anodize the aluminum with a black material to discourage theft by aluminum thieves.

The frame 12 includes an hub assembly 14. The hub assembly 14 preferably includes conventional parts, such as bearings 16, washers 18, nut 20, bolt 22, sleeve 24, retaining ring 26, hub 28, and other parts commonly used to assemble a hub.

A sheave wheel 30 is mounted on the hub assembly 14. The sheave wheel is manufactured of a non-conducting material to prevent unintentional current flow from the cable through the stringing block. This represents an important safety feature, because aluminum stringing blocks have been known to burn up from accidental current spikes through the block. The wheel 30 is sized to fit over the hub assembly 14. When used for stringing power distribution systems, the wheel size typically ranges from three to ten inches, with a seven-inch wheel being particularly preferred.

The wheel 30 is preferably fabricated of a durable, self lubricating polymeric material. Polymeric materials having a low coefficient of friction are preferred. The coefficient of friction is preferably less than 0.5 and more preferably in the range from 0.15 to 0.35. Although counter-intuitive, it has been found that wheels having a low coefficient of friction tend to last longer and cause less harm to the cable being installed than other comparable wheels.

The class of special high performance plastics, known as engineering plastics, are a currently preferred material used to manufacture the wheel 30. Many of these plastics contain nylon. Engineering plastics often include additives to improve properties of the polymeric material. As used in the present invention, the polymeric material preferably includes an additive to improve or lower the coefficient of friction. Molybdenum disulfide is one useful additive in the polymeric material. Another useful additive is oil. One currently preferred polymeric material is PA6-G-type nylon, manufactured by Timco.

The cable stringing block 10 preferably includes a socket eye fitting 34 for easy installation to insulators and other mounting adapters. A socket eye pin 36 enables quick removal of the socket eye fitting 34 and replacement with other compatible mounting adapters.

A handle 38 is preferably affixed to or integral with the frame 12 to facilitate manual transport of the block assembly. In addition, the handle 38 also facilitates set up and removal of the block assembly by providing a means of holding the block assembly while it is clamped and positioned in place.

The handle 38 also represents an important safety feature. Without a handle, workers tend to pick up conventional stringing blocks by grabbing the wheel. The block then pivots and pinches the workers' fingers within the frame. Thus, the handle 38 provides useful benefits.

A spring-biased fly-in gate 40 is preferably provided to facilitate side-loading of the cable being installed. A hinge pin 42 and hinge spring 12 provide biasing for the gate 40. In operation, the gate 40 freely opens inward The gate 40 remains operable at all times. It is not locked or affixed to frame 12 in a manner which prevents the gate 40 from opening inward. No force load is born by the gate 40. This feature requires the frame to be constructed to support the entire force of the cable with just one side of the frame 40.

As shown in FIG. 3, the stringing block 10 can be configured for use with a helicopter arm 48 for loading of the cable. A helicopter arm mounting bracket 50 and support strut 49 are provided for this purpose.

One or more pin holes 54 are provided to permit the stringing block 10 to be attached to brackets or other structures commonly used in the art.

Figure 4:
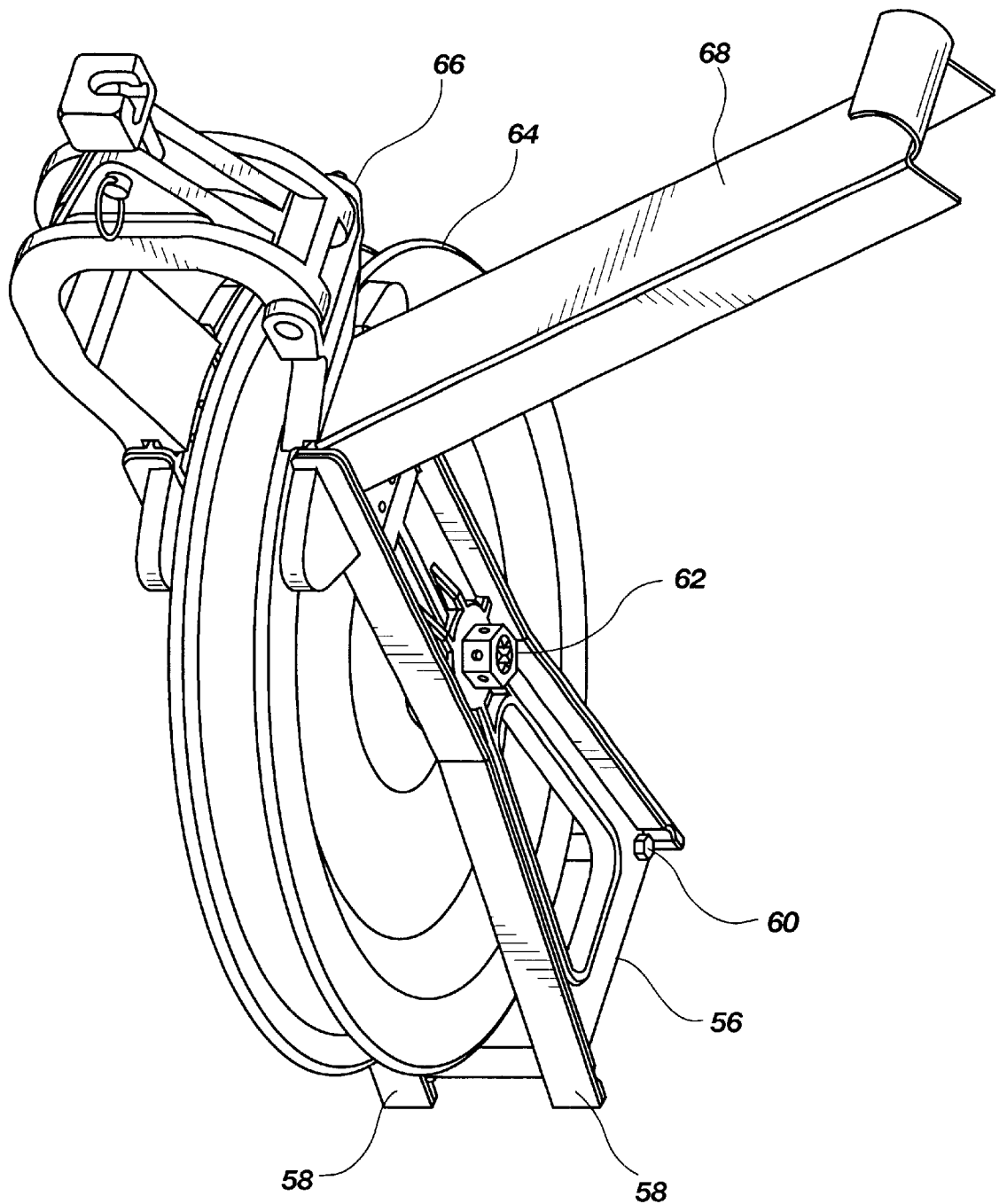
FIG. 4 is a perspective view of another cable stringing block within the scope of the present invention.

Another cable stringing block assembly within the scope of the present invention is illustrated in FIG. 4. This stringing block is adapted for use with larger diameter sheave wheels, such as those used in stringing power transmission cables. The stringing block includes a frame 56. In the embodiment illustrated in FIG. 4, the frame 56 is constructed from two frame members 58 which are secured together with bolt 60, or other suitable attachment structure. Frame members 58 are advantageously cast from the same mold, thereby facilitating convenient manufacture and repair of the device. The frame 56 includes an axle assembly 62. The axle assembly 62 preferably includes conventional parts commonly used to assemble an axle.

A sheave wheel 64 is mounted on the axle assembly 62. As with sheave wheel 30, the sheave wheel 64 is manufactured of a non-conducting material to prevent unintentional current flow from the cable through the stringing block. The wheel 64 is preferably fabricated of the same durable, self lubricating polymeric materials as sheave wheel 30. When used for stringing cable for power transmission systems, the wheel size typically ranges from ten to fifty inches.

A spring-biased fly-in gate 66 is preferably provided to facilitate side-loading of the cable being installed. In operation, the gate 66 freely opens inward. The gate 66 remains operable at all times. As shown in FIG. 4, the stringing block can be configured for use with a helicopter arm 68 for loading of the cable.

The present invention may be embodied in other specific forms without departing from its essential characteristics. The described embodiments are to be considered in all respects only as illustrative and not restrictive. The scope of the invention is, therefore, indicated by the appended claims rather than by the foregoing description.

The claimed invention is:

1. A cable stringing block assembly comprising:
   a frame structure having an axle assembly, wherein the frame is constructed of cast aluminum; and
   a non-conducting sheave wheel sized to fit within the axle assembly, said wheel being fabricated of a durable, self-lubricating polymeric material, wherein the polymeric material has a coefficient of friction less than 0.5.

2. A block assembly according to claim 1, further comprising a handle affixed to the frame structure to facilitate transport of the block assembly.

3. A block assembly according to claim 1, wherein the polymeric material has a coefficient of friction in the range from 0.15 to 0.35.

4. A block assembly according to claim 1, wherein the polymeric material comprises engineering plastics.

5. A block assembly according to claim 1, wherein the polymeric material comprises nylon.

6. A block assembly according to claim 1, wherein the polymeric material comprises PA6-G-type nylon.

7. A block assembly according to claim 1, wherein the wheel has a size of from three to ten inches.

8. A block assembly according to claim 1, wherein the wheel has a size of from ten to fifty inches.

9. A block assembly according to claim 1, wherein the wheel has a size of from sixteen to twenty-two inches.

10. A block assembly according to claim 1, further comprising a spring-biased fly gate to facilitate side-loading of the cable.

11. A block assembly according to claim 10, wherein the spring-biased fly gate does not lock to the frame.

12. A block assembly according to claim 1, wherein the cast aluminum frame is anodized.

13. A block assembly according to claim 1, further comprising an attachment member for helicopter loading of the power conductor cable.

14. A cable stringing block assembly comprising:
    a frame structure having an axle assembly, wherein the frame is constructed of cast aluminum;

a handle affixed to the frame structure to facilitate transport of the block assembly; and a non-conducting sheave wheel having a diameter in the range from about three inches to about fifty inches, said wheel being fabricated of a durable, self lubricating polymeric material, wherein the polymeric material has a coefficient of friction less than 0.5.

15. A block assembly according to claim 14, further comprising a spring-biased fly gate to facilitate side-loading of the power conductor cable.

16. A block assembly according to claim 15, wherein the cast aluminum frame is anodized.

17. A block assembly according to claim 15, wherein the polymeric material has a coefficient of friction in the range from 0.15 to 0.35.

18. A block assembly according to claim 15, wherein the polymeric material comprises engineering plastics.

19. A block assembly according to claim 15, wherein the polymeric material comprises nylon.

20. A block assembly according to claim 15, wherein the polymeric material comprises PA6-G-type nylon.

* * * * *